Patented Sept. 21, 1943

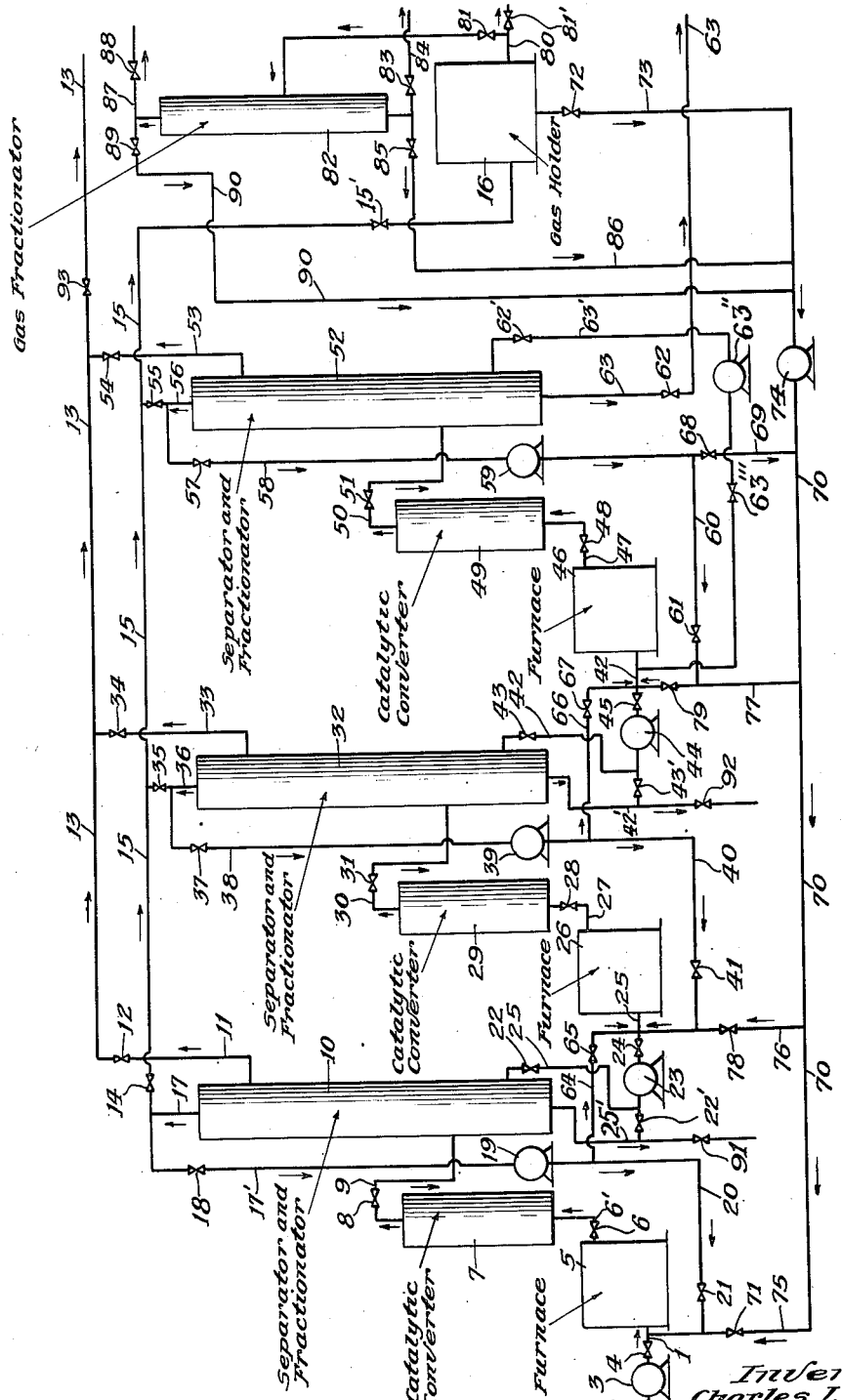

2,330,089

UNITED STATES PATENT OFFICE 2,330,089

MULTISTAGE CATALYTIC CONVERSION OF HYDROCARBONS

Charles L. Thomas and Gustav Egloff, Chicago, Ill., assignors to Universal Oil Products Company, Chicago, Ill., a corporation of Delaware Application January 13, 1939, Serial No. 250,797

9 Claims. (Cl. 196—49)

This invention relates to the catalytic conversion of hydrocarbon distillates produced by the distillation of heavy hydrocarbonaceous materials, and more particularly distillates which are vaporizable without substantial decomposition. Although usually from petroleum sources, in certain instances distillates produced from coal tars, shale oils, and the like may be converted by this process.

More specifically, the invention is concerned with the conversion of hydrocarbons by means of specially prepared catalysts, which are selective in promoting the formation of high octane number gasoline, and gases of a particularly desirable composition.

The art of producing gasoline and gas by thermal cracking of petroleum oils is extensive and because of the large amount of investigation, has been developed to the point where the principles involved are well understood. The catalytic conversion of hydrocarbons, and more specifically catalytic cracking of high-boiling hydrocarbon fractions from petroleum source to produce gasoline and gas is not so well understood. Such explanations as have been set forth are largely of an empirical nature and a discussion of these reactions is, therefore, best confined to facts.

A great many catalysts have been proposed to assist the thermal conversion of distillates into gasoline and gas, among which are certain types which sponsor, as the predominating reaction, the formation of gas rather than gasoline. Such catalysts include the reduced metal catalysts, such as nickel and iron and their ores. These catalysts are, furthermore, subject to poisoning by sulfur compounds and tend to produce coke-like materials which deposit as a film around the catalyst particles and render them inactive. Other types of catalysts promote dehydrogenation reactions, that is, splitting of the hydrocarbon at the carbon-hydrogen bond, rather than at the carbon-carbon linkage, and as a consequence the character of the gases and the antiknock properties of the gasoline produced are considerably different from those which are used in the present invention.

In one specific embodiment the present invention comprises a method for converting hydrocarbon fractions containing substantially no gasoline, into high yields of gasoline and gases containing large percentages of polymerizable olefins, which consists in contacting such fractions with catalysts comprising specially prepared silica-alumina composites in successive stages with separation of gasoline and gas between stages, the conditions of temperature being increased in each succeeding stage so as to produce a maximum of catalytic conversion with a minimum of thermal decomposition, while recirculating a portion of the gases produced in the process to any or all conversion stages.

Although the present process may have more or less applicability when using cracking catalysts which may be produced by the chemical treatment of naturally occurring clays, the preferred catalyst comprises specially prepared synthetic masses, for example, silica-alumina, silica-zirconia, silica-alumina-zirconia, and silica-alumina-thoria having a very high degree of activity. These masses are prepared by mixing the precipitated components under controlled conditions whereby alkali metal ions are excluded. In these catalysts the ratio of the components may vary within wide limits and the masses may be considered to comprise intimate or possibly molecular admixtures, all of the components indicating more or less low activity individually but in the aggregate displaying high activity. The activity also is not an additive function of the individual component, it being relatively constant for a wide range of proportions whether in molecular, or fractions of molecular proportions. It appears that no one component can be determined as the one component for which the remaining components may be considered as the promoter according to conventional terminology. In the present invention these catalysts are used in the form of sized particles or other formed shapes such as pellets produced by compression or extrusion methods. The pressed composites after drying and forming into definite shapes are calcined at temperatures above 800° F. prior to contacting with the hydrocarbons.

The methods of preparation of these catalysts are not the subject of the present invention and have been described in copending application Serial No. 236,548, filed Oct. 22, 1938, as well as Patent No. 2,285,314, dated June 2, 1942, and Patents Nos. 2,289,918 and 2,289,919, dated July 14, 1942. The character of the catalysts described may vary somewhat depending upon the exact method of preparation and on the composition used. All of them have been found to be excellent catalysts although they are not necessarily exact equivalents. Some catalysts may be useful for the conversion of naphthas or reforming of gasolines, others more efficient for the cracking of gasoline, and still others for the conversion of high-boiling distillates. Such catalysts have been found to accelerate the cracking of petroleum and other hydrocarbonaceous distillates to increase the yields of high octane number gasoline, as well as the yields of polymerizable olefins which are readily converted to high octane number motor fuel. These particular catalysts have also been found to be selective in bringing about the reactions resulting in the production of premium quality gasoline, and at the same time are of such a character that they stand up under severe conditions of handling, as well as of successive processing and regeneration. They are further characterized by the ease and accuracy with which they may be reproduced.

The removal of the alkali metal ions particularly those of sodium from the catalyst composites during preparation is of particular importance, since the presence of these ions causes certain undesirable side reactions to occur and also brings about a decrease in catalytic selectivity and activity. This may possibly be caused by reactions resulting in a decrease at elevated temperatures in the internal surface and porosity of the catalysts resulting in reduction of activity to an extent such that the predominant reaction is no longer of a catalytic nature. It may also be possible that the alkali metal compounds tend to catalyze reactions of an undesirable character. Whatever the explanation, we have observed that the removal of alkali metal compounds is of primary importance and our preferred catalysts are of this nature. Under certain circumstances it may be desirable to use catalysts of different composition in the different conversion zones of our process, although from a practical standpoint this is seldom the case.

It has been found that certain hydrocarbon fractions require somewhat different conditions of cracking, depending upon the character of the crude oils from which they are derived and the boiling range of the fraction.

It has been found that the unconverted bottoms remaining after separation of gasoline and gas after the cracking step is of a more refractory nature than the virgin stock and that improvement is obtained by increasing the conversion temperature in each succeeding conversion stage. In addition we have found it advantageous to continuously pass a portion of the gases formed in the process back to any or all of the conversion stages. This may be done in any of several ways. The gas may be separated after each conversion stage and a portion of it recycled to the stage in which it was produced. Another method of operation is to combine a regulated portion of the process gases with the unconverted oil from each conversion stage and pass it to the succeeding conversion stage, a portion of the gas from the final conversion stage being returned to the first stage. Still another alternative is to collect the gases from all conversion stages and to pass a regulated portion of this gas to each of the conversion stages. The ratio of gas to liquid returned to each stage may vary. For example, it has been found in certain instances that it is advantageous to return increasing proportions of gas to succeeding converters. That is, the initial stage receives the least amount of gas, the second stage an increased amount, and the third stage a still larger volume of gas compared to the volume of oil in each step.

Our invention is exemplified in the attached drawing. According to one method of operation the distillate is pumped through line 1 and valve 2 by pump 3 through control valve 4 into furnace 5, and thence through valve 6, line 6' into catalytic converter 7, which may be any suitable type of converter, such as a series of tubes filled with catalysts which are connected for parallel flow or may be of a type for handling of powdered catalysts, etc. Although the flow is shown in an upward direction it is understood that it may be either up or down and is usually preferably downflow. The distillate is converted into gasoline and gas with a portion of it remaining unconverted. The conversion products pass from converter 7 through valve 8 and line 9 to separator 10 where the gasoline, gas and unconverted distillate are separated. From this point on several methods of operation may be followed. In the first of these the gasoline is taken through line 11 and valve 12 through a cooler not shown and passed through line 13 to storage, where it is mixed with gasoline from the succeeding steps. It should be borne in mind that the fractionator 10 may suitably consist of two vessels, in one of which the bottoms are separated from the gasoline and gas, and the second consisting of a stabilizer in which the gasoline and gas are separated from one another. This is the probable method of operation but in the interests of simplifying the drawing, the fractionator and stabilizer are shown as one vessel. The gas passes overhead and in one method of operation a portion of the gas may be drawn through valve 14, line 15 and valve 15' to gas holder 16 and disposed of in whatever manner fits the particular needs of the refiner. A second portion of the gas is drawn through line 17 and 17' and valve 18 by compressor 19 and passed through line 20 and valve 21 back to line 1 where it is mixed with the charging stock and recirculated through heater 5 and catalytic converter 7. The unconverted bottoms from tower 10 are drawn through valve 22 by pump 23 and passed through valve 24 in line 25 through heater 26. A portion of the bottoms may be withdrawn through line 25' and valve 91; alternatively the entire bottoms may be passed through line 25' and valve 22' to heater 26. The oil then passes through line 27 and valve 28 into catalytic converter 29 which is similar to 7 and which is operated at a suitably adjusted temperature and is of a suitably different size to bring about the optimum conversion of the heavy bottoms to gasoline and gas. The products of cracking are passed through line 30 and valve 31 to separator 32 which is similar to separator 10 and as in the case of separator 10 may suitably consist of a separate fractionator and stabilizer. The gasoline is taken through line 33 and valve 34 through a cooler not shown and is sent to storage in the common gasoline run-down line 13. The gases are taken overhead, a portion being drawn through valve 35 and line 36 and combined with the gases from the first converter in line 15. Another portion of the gas is drawn through valve 37 and line 38 by pump 39 and passed through line 40 and valve 41 into line 25 where it is combined with the bottoms from fractionator 10 and passed through furnace 26 back to catalytic converter 29. The bottoms from separator 32 pass through line 42 and valve 43 to pump 44 and through valve 45 to heater 46. A portion of the heavy bottoms may be withdrawn from the separator through line 42' and valve 92 or the entire bottoms may be passed through line 42' and valve 43' to heater 46 from which they pass through line 47 and valve 48 to catalytic converter 49, which is similar to converters 7 and 29 except that its size has been suitably adjusted to compensate for the smaller through-put. The temperature of this converter is higher than that of converter 29 in order to obtain the maximum yield of gasoline and gas from the more refractory stock being processed. The conversion products pass through line 50 and valve 51 to separator 52 which is similar to separators 10 and 32. The gasoline passes through line 53 and valve 54 to the gasoline run-down line 13. Portions of the reaction gases are drawn through valve 55 and line 56 and mixed with the unrecirculated gases from the previous conversion steps in line 15. Another portion of the gas is drawn through valve 57 and line 58 by pump 59 and passed through line 60 and valve 61 into line 42 where it is blended with the bottoms from converter 32 and then passed to catalytic converter 49. The unconverted bottoms may be passed to a further stage of conversion but ordinarily sufficient conversion has occurred in three stages so that an additional stage is found to be impractical. The bottoms are drawn through valve 62 and line 63 through a suitable cooler to storage. Alternatively a portion of the unconverted oil may be passed through valve 62' and line 63' by pump 63'' and valve 63''' to line 42 and then to a heater 46 for further conversion in catalytic converter 49.

An alternative method of operation is similar in many respects except that the gas flow from the various separators is different. The flow of charging stock and of unconverted bottoms is exactly the same as in the case just described. A portion of the gases from separator 10 is taken through line 17 and valve 18 and line 17' by compressor 19 and passed through line 64 and valve 65 from which it mixes with the unconverted bottoms from separator 10 in line 25 and passes through heater 26, line 27 and valve 28 to converter 29. The reaction products pass through line 30 and valve 31 into converter 32 where gasoline, gas, and unconverted bottoms are separated, as previously described. A portion of the gases pass through valve 37 and line 38 and are pumped by compressor 39 through line 66 and valve 67 to join with the unconverted bottoms from separator 32 in line 42. The mixture then passes through furnace 46, line 47 and valve 48 to catalytic converter 49 and separator 52 by the previously described route. A portion of the gases from separator 52 passes through valve 57 and line 58 and is pumped by compressor 59 through valve 68 and lines 69, 70 and 75 and valve 71 to line 1 where it is mixed with the incoming charging stock and passed through heater 5 and into the catalytic conversion step as previously described.

Another method of operation is to collect, in gas holder 16, all of the gases from separators 10, 32, and 52 by means of line 15. From this point any or all of the catalytic conversion steps may be supplied by any desired amount of the process gases in the following way: The gas may be drawn through valve 72 and line 73 by compressor 74 and into line 70 which is connected to the various conversion stages by lines 75, 76 and 77. The gases are proportioned by means of valves 71, 78 and 79 to each catalytic conversion stage, passing through valve 71 which joins with line 1 and thence to the first stage by routes previously described; and similarly to the second stage by valve 78 to join with line 25 and thence to the second conversion stage; and by means of valve 79 to line 42 from which they pass to the third conversion stage.

In some instances it may be desirable to separate the higher and lower boiling portions of the gases and recycle only one of these portions. In this case the gas is taken from gas holder 16 through line 80 and valve 81 to separator 82 where the gas may be divided into several portions. Ordinarily one portion consists of a combined $C_3$ and $C_4$ hydrocarbon fraction which may be drawn through valve 83 and line 84 to storage tank or further processing, or may be passed through valve 85 and line 86 by compressor 74 where it passes through line 70 and is proportioned by previously described means to the first, second and third conversion stages. In this case the gas boiling below the propane-propene fraction is passed through line 87 and valve 88 to whatever disposal has been provided for it.

It is preferred, however, to remove portions of the gas, such as the $C_3$ and $C_4$ fraction through valve 83 and line 84 and to pass the lighter than $C_3$ gases through valve 89 and line 90 by means of compressor 74 into line 70 and thence by previously described routes to the various conversion stages. In some instances the light gases including $C_3$ are used for recycling.

Valve 93 is merely a control valve in the gasoline run-down line. Valve 81' furnishes a means for removing gas from the gas holder.

The exact reason for the result obtained by recirculating of the process gas is not known. However, it is known that olefins are much more readily converted to gas and lower molecular weight olefins than the corresponding paraffin hydrocarbons and that the catalytic cracking process produces gasoline and gas which are highly olefinic in nature. It may be that the cracking reaction being of an equilibrium character, the introduction of gas tends to disturb the equilibrium to a point such that increased gas production is suppressed.

Another possible explanation is based upon the fact that reductions in pressure during catalytic cracking have been found to be beneficial and it may be that the recycle gas serves the purpose of reducing the partial pressure of the oil, which has the effect of reducing the pressure under which it is cracked, and as a consequence improves the yields which are obtainable on a once-through basis. It should be borne in mind that these explanations are in the nature of conjecture and that we do not limit ourselves to this explanation in any way, but propose to rest our invention upon the fact that improved results are obtained by the methods described.

The term conversion stage as used herein is understood to consist of a heating step, a catalytic cracking step and a step for the separation of reaction products such as gasoline and gas from the residual oil.

The terms "unconverted oil" and "unconverted bottoms" as used in the appended claims are understood to mean that portion of the charging stock which is of higher than gasoline boiling range remaining after any or all conversion stages.

The cracking catalyst is of such a nature that it gradually decreases in activity and it becomes necessary to regenerate it from time to time. This is done by heating it at intervals with controlled amounts of oxygen-containing gas. The exact procedure will depend upon the equipment used in the process. For example, the catalytic cracking steps of each stage may be in duplicate, one being regenerated while the other is processing. Another method is to alternate the processing and regeneration stages in the same apparatus.

Although the flow as indicated in the drawing is in an upward direction, it may be in either direction and is preferably downward.

Example

As an example of our process a 37.3° A. P. I. gravity Pennsylvania gas oil was converted into gasoline and gas and a minor quantity of unconverted oil having the boiling range, gravity and other properties suitable for use as a domestic fuel oil, in the following manner: The virgin oil was passed over a silica-alumina cracking catalyst which was prepared by the coprecipitation of silica and alumina followed by treating with ammonium chloride and water for removal of alkali metals, shaping into pills and calcining at 1000° F. The gas oil was then cracked in the manner described in the foregoing description, the total gas being collected and 750 cubic feet of gas per barrel of oil was recycled in equal volumes to each conversion zone. The first stage was maintained at a temperature of 932° F., the second stage at 1022° F. and the third stage at 1115° F. A yield of 74.2% of 81 octane number gasoline was obtained which included that made by polymerizing the gaseous olefins produced in the process. The process yielded 2.2% more gasoline than when operated in a similar manner without gas recirculation, and 12% more than one in which the temperature was maintained at 932° F. throughout the entire conversion.

By recycling the major portion of the unconverted bottoms from the final stage back to said stage the total conversion to gasoline amounted to 85.5% including the motor fuel produced by polymerizing the olefins in the gases.

We claim as our invention:

1. A conversion process which comprises subjecting hydrocarbon oil to cracking treatment in a series of stages in the presence of a cracking catalyst comprising silica and alumina, separating gasoline, gases and insufficiently converted oil after each of the stages, supplying insufficiently converted oil from a preceding to a succeeding stage of the series, increasing the cracking temperature from stage to stage of the series, introducing a portion of said gases to each of the stages, and increasing the ratio of gas to oil in the successive stages in the direction of increasing temperature.

2. A conversion process which comprises subjecting hydrocarbon oil to cracking treatment in a series of stages in the presence of a cracking catalyst comprising silica and zirconia, separating gasoline, gases and insufficiently converted oil after each of the stages, supplying insufficiently converted oil from a preceding to a succeeding stage of the series, increasing the cracking temperature from stage to stage of the series, introducing a portion of said gases to each of the stages, and increasing the ratio of gas to oil in the successive stages in the direction of increasing temperature.

3. A conversion process which comprises subjecting hydrocarbon oil to cracking treatment in a series of stages in the presence of a cracking catalyst comprising silica, alumina and zirconia, separating gasoline, gases and insufficiently converted oil after each of the stages, supplying insufficiently converted oil from a preceding to a succeeding stage of the series, increasing the cracking temperature from stage to stage of the series, introducing a portion of said gases to each of the stages, and increasing the ratio of gas to oil in the successive stages in the direction of increasing temperature.

4. The process as defined in claim 1 further characterized in that there is maintained a local cycle of gases from and back to each of the stages.

5. The process as defined in claim 2 further characterized in that there is maintained a local cycle of gases from and back to each of the stages.

6. The process as defined in claim 1 further characterized in that gases withdrawn from a preceding stage are introduced to a succeeding stage of the series.

7. The process as defined in claim 2 further characterized in that gases withdrawn from a preceding stage are introduced to a succeeding stage of the series.

8. The process as defined in claim 1 further characterized in that the gases from said stages are combined and a portion of the resultant mixture introduced to each of the stages.

9. The process as defined in claim 2 further characterized in that the gases from said stages are combined and a portion of the resultant mixture introduced to each of the stages.

CHARLES L. THOMAS.
GUSTAV EGLOFF.